United States Patent [19]
Morishita et al.

[11] Patent Number: 4,562,896
[45] Date of Patent: Jan. 7, 1986

[54] POWER STEERING CONTROL APPARATUS

[75] Inventors: Mitsuharu Morishita; Shinichi Kouge, both of Himeji, Japan

[73] Assignee: Mitsubishi Denki Kabushiki Kaisha, Tokyo, Japan

[21] Appl. No.: 670,228

[22] Filed: Nov. 13, 1984

[30] Foreign Application Priority Data

Nov. 15, 1983 [JP] Japan ................ 58-213198

[51] Int. Cl.$^4$ .................................... B62D 5/06
[52] U.S. Cl. ................................... 180/142
[58] Field of Search .............. 180/142, 143, 79.1

[56] References Cited

U.S. PATENT DOCUMENTS 3,820,619  6/1974  Ezoe et al. .............. 180/142
4,392,540  7/1983  Michio et al. ........... 180/142
4,476,529  10/1984 Nakamura et al. ........ 180/142

FOREIGN PATENT DOCUMENTS 55-39882  3/1980  Japan .
55-94854  7/1980  Japan .

Primary Examiner—John A. Pekar
Assistant Examiner—Donn McGiehan
Attorney, Agent, or Firm—Leydig, Voit & Mayer Ltd.

[57] ABSTRACT

A power steering control apparatus for a car in which, under normal conditions, the steering becomes heavy as the speed of the car increases for the purpose of safety. This is realized by means of a hydraulic valve controlled by the reaction oil pressure of a proportional solenoid in the steering mechanism. In an abnormal condition such as the shortcircuit between solenoid coils or the failure of an electric control circuit, the proportional solenoid is deenergized through a failsafe circuit due to the fact that a feedback signal from the solenoid has become zero and the error with a high amplification gain between the car speed inverse proportional signal and the feedback signal has exceeded a first predetermined value. On the occasion of the voltage reduction of the power source for the electric control circuit and/or the increased temperature of the proportional solenoid, the failsafe circuit is disabled by an error protection circuit only when the difference between the car speed inverse proportional signal and the reduced feedback signal exceeds a second predetermined value.

15 Claims, 6 Drawing Figures

POWER STEERING CONTROL APPARATUS

BACKGROUND OF THE INVENTION

This invention relates to a power steering control apparatus used for an automobile etc., and in particular to a power steering control apparatus having an improved failsafe electrical system for improving the operating safety thereof during a high speed running upon the occurrence of an abnormal condition.

Generally, it is required that a power steering control apparatus for an automobile reduce (lighten) the manual steering power required in proportion to the steering load while increasing the manual steering power required in proportion to the car speed so as to make the steering operation safe during a high speed running.

Such a power steering control apparatus is generally illustrated in FIG. 1 wherein a pump 1 supplies a steering oil pressure Pc through a power steering control valve 2 to a power cylinder 3. The steering oil pressure Pc is also supplied to a reaction chamber 4, which is disposed in the power steering control valve 2, through a hydraulic (oil pressure) control valve 5. The oil pressure Pc is controlled by the operation of the valve 5 actuated by a proportional solenoid 6 which receives as inputs, through an electrical control circuit 7, pulses corresponding to a car speed signal from a car speed sensor 8. The output of the hydraulic control valve 5, namely the controlled oil pressure Pr, is supplied to the reaction chamber 4 to develop a manual steering power in a steering wheel according to a steering load and a car speed. One example of the details of the electrical control circuit 7 is described in the prior U.S. patent application Ser. No. 664,416, titled "Power Steering Control Apparatus" by the same inventors as this invention, filed on Oct. 24, 1984, and is incorporated herein for reference.

In the event that one end of the coil of the proportional solenoid or an electric wire in the car is grounded due to the failure of the wire from the electrical control circuit 7 to the proportional solenoid 6 or of the proportional solenoid 6 per se, the electrical control circuit 7 as above noted includes a failsafe circuit operative to an abnormal feedback condition in which the output voltage of an error amplifying circuit which compares a voltage in inverse proportion to a car speed with a feedback signal from the proportional solenoid is detected whereby an electrical current to the proportional solenoid 6 is interrupted by means of a protection relay unless the output voltage of the error amplifying circuit decreases to zero in a predetermined time interval and the interrupted state is held until a key switch is turned off in order that the proportional solenoid 6 is not burned due to an excessive current flowing through the coil 6 caused by the above ground fault.

The coil resistance of the proportional solenoid 6 is selected so that approximate by a current double the rated current may flow through the solenoid coil when a DC power source (battery) of, for example, 13 V is applied thereto a failsafe circuit is not activated even though the coil resistance increases by approximately a factor of 0.5 due to the thermal increase owing to an excessive current flowing through the coil.

However, the battery voltage may be reduced to i.e., 6 V on such an occasion as operating a starter motor to start the engine and/or the current through the coil of the proportional solenoid 6 may decrease due to the solenoid being heated. In this state, a predetermined current necessary for the definite operation of the solenoid 6 might not flow through the solenoid. Therefore, even when a predetermined time interval lapses in this state, the output voltage of the error amplifying circuit does not decrease so that the failsafe circuit is erroneously activated to interrupt the power source for the proportional solenoid 6 until the key switch is turned off, disadvantageously resulting in a heavy steering load irrespective of the car speed.

In this connection, Japanese Patent Application Laid-open Nos. 55-94854 and 55-39892 disclose a control system which electrically controls a main operating cylinder for a power steering.

SUMMARY OF THE INVENTION

The present invention has been made to solve the above conventional problem.

It is accordingly an object of the invention to provide a power steering control apparatus including an electrical control system with a protection function for preventing a failsafe circuit from being erroneously activated due to the thermal increase of a proportional solenoid and/or the reduction of a power source voltage.

The electrical control system is composed of a car speed sensor, a power source, an electric control circuit connected to the car speed sensor and the power source, and a proportional solenoid, responsive to the output of the electric control circuit, for providing a steering reaction oil pressure. The electric control circuit produces a command signal in inverse proportion to the output of the car speed sensor. A current signal flowing through the proportional solenoid is detected and compared as a feedback signal with the command signal to develop an error signal therebetween in an error amplifying circuit with a high amplification gain. From the error signal a driving signal is developed for the proportional solenoid. A failsafe circuit, responsive to the error signal, detects a predetermined abnormal condition in which the amplified error signal exceeds a first predetermined value and holding the abnormal condition. Responsive to the output of the failsafe circuit, a protection relay passes the electrical energy from the power source to a solenoid driving circuit in the normal condition while interrupting the electrical energy to the driving circuit in the predetermined abnormal condition. Means is provided for comparing the command signal and the feedback signal to provide an output signal only when the output signal is larger than a second predetermined value. An AND circuit is provided for enabling the output of the failsafe circuit when the output of the above means is provided.

The above means provides the predetermined voltage difference of the command signal multiplied by a predetermined ratio with the feedback signal unless the feedback signal is extremely or abnormally zero, and has a comparator as an error protection circuit which serves for overriding the failsafe circuit when the comparator receives as an input thereto a voltage larger than the above predetermined voltage difference. A first voltage divider divides the command signal voltage and a second voltage divider divides the command signal voltage. The first and second voltage divider are preset such that the predetermined voltage difference is provided unless the feedback signal is abnormally zero. The AND circuit is connected to the outputs of the failsafe circuit and the error protection circuit.

BRIEF DESCRIPTION OF THE DRAWINGS

The present invention will be readily apparent from the accompanying drawings in which.

It is to be noted that throughout the figures the same reference numerals designate identical or corresponding portions.

DETAILED DESCRIPTION OF THE PREFERRED EMBODIMENT

Figure 2:
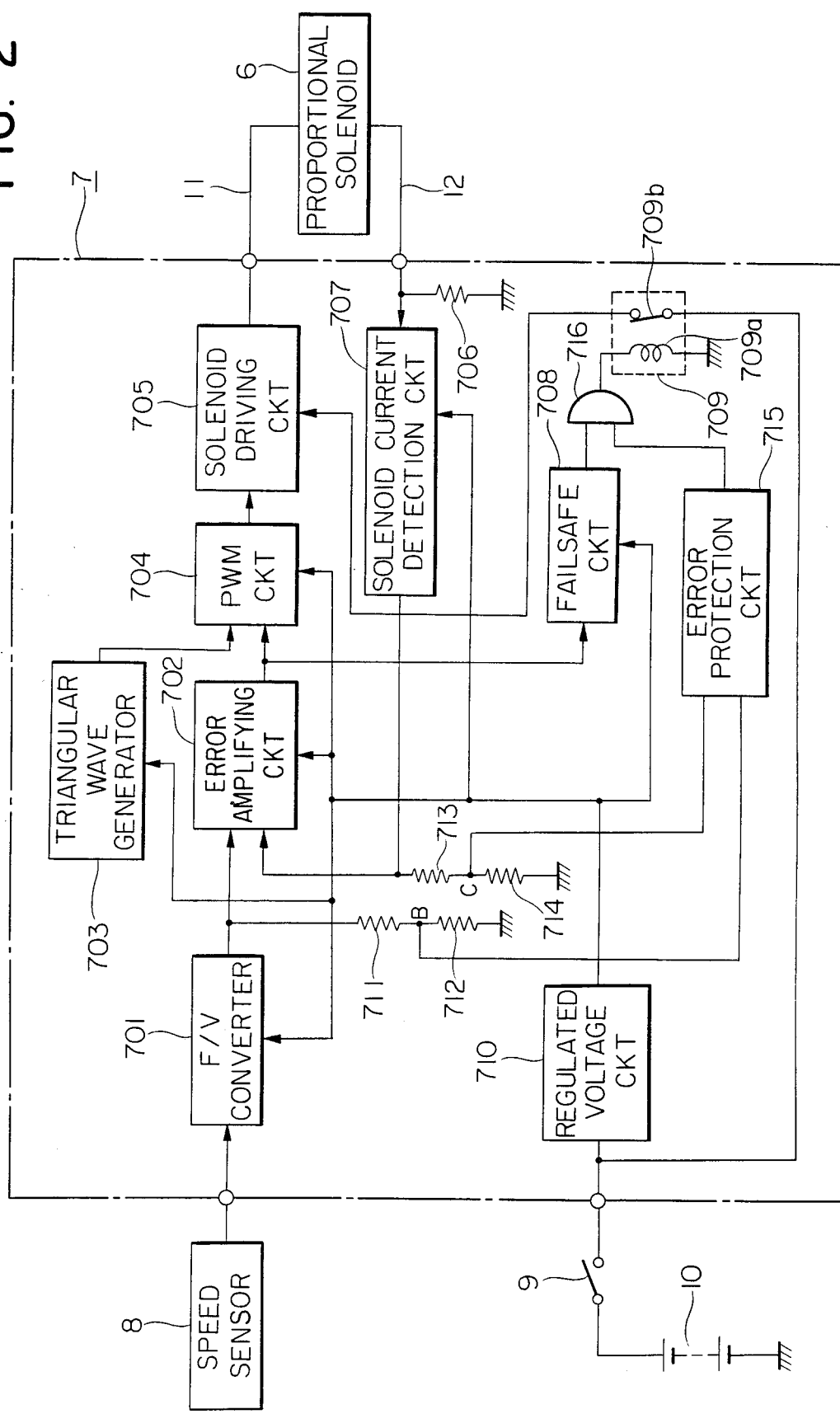
FIG. 2 shows a schematic block diagram of one preferred embodiment of a power steering control apparatus according to the present invention.

Referring now to the drawings, particularly to FIG. 2, one preferred embodiment of a power steering control apparatus according to this invention is shown in which only the essential elements are shown for the sake of illustration.

Figure 1:
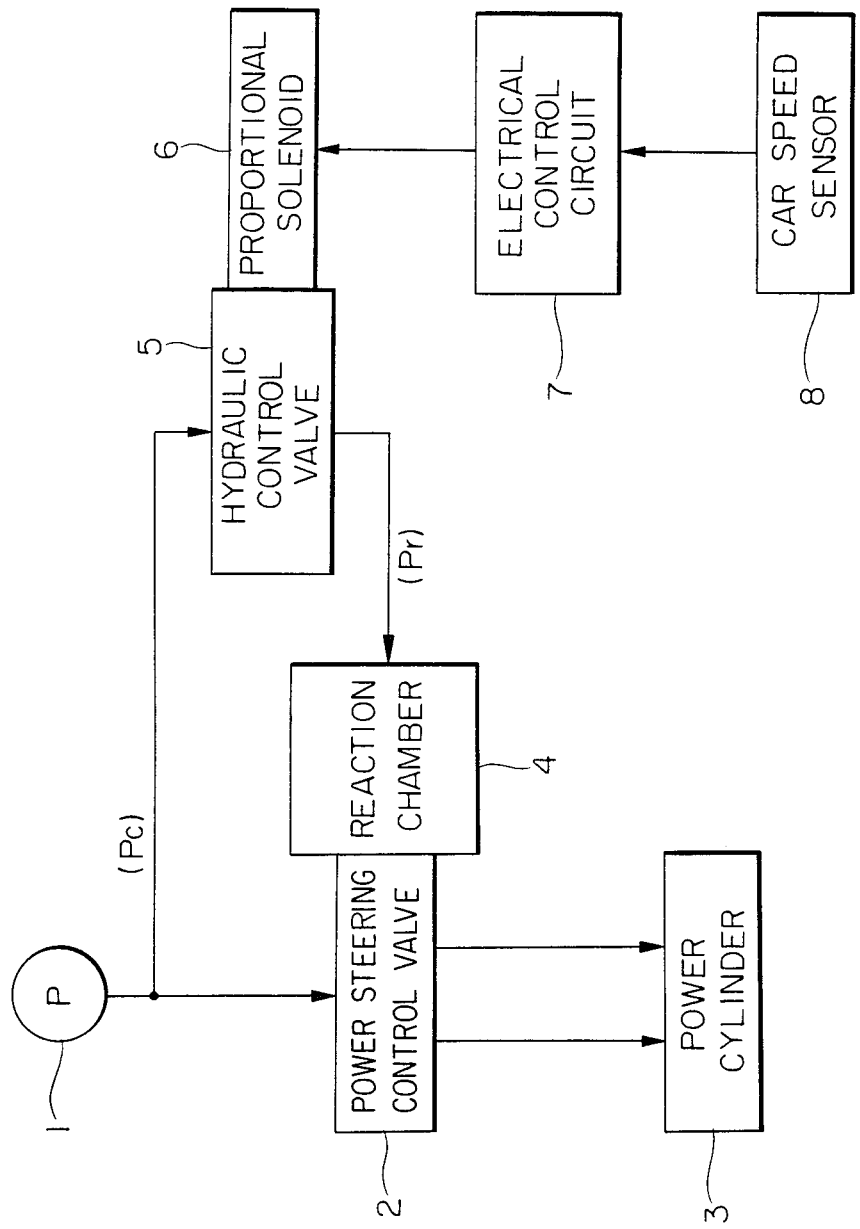
FIG. 1 shows a schematic block diagram of an arrangement of a general power steering control apparatus.

In the figure, the positive terminal of a DC battery 10 mounted on a car is connected to one terminal of a key switch 9 and the negative terminal thereof is grounded. The other terminal of the key switch 9 and a car speed sensor 8 shown in FIG. 1 are electrically connected to the proportional solenoid 6 shown in FIG. 1 through an electric control circuit 7. The speed sensor 8 may be of the type which uses pulses of a speed meter of a reed-switch or a transistor type. The proportional solenoid 6 controls the hydraulic control valve 5 shown in FIG. 1, for providing a reaction oil pressure for a steering mechanism, in proportion to the level of its conduction current. The electric control circuit 7 receives as an input an electrical power from the battery 10 through the key switch 9, receives as an input a speed signal from the sensor 8, and consequently provides as an output therefrom a current signal in inverse proportion to the car speed, thereby to drive the proportional solenoid 6.

The electrical control circuit 7 is composed of a frequency/voltage (F/V) converter 701, an error amplifying circuit 702, a reference wave generator 703, a pulse width modulation (PWM) circuit 704, a proportional solenoid driving circuit 705, a shunt resistor 706, a solenoid current detection circuit 707, a failsafe circuit 708, a protection relay 709 including a coil 709a and a normally closed contact 709b, and a regulated voltage circuit 710.

The arrangement as just described is the same as described in the above noted U.S. patent application Ser. No. 664,416.

In addition to this arrangement, the electrical circuit 7 according to this invention includes voltage dividing resistors 711–714, an error protection circuit 715 which is utilized as a second failsafe circuit, and an AND gate 716. The series combination of the resistors 711 and 712 is connected between the output of the F/V converter 701 and ground to detect a reference voltage corresponding to a car speed while the series combination of the resistors 713 and 714 is connected between the output of the solenoid current detection circuit 707 and ground to detect a feedback voltage corresponding to the solenoid current. The error protection circuit 715 receives as inputs thereto a voltage appearing at the junction B of the resistors 711 and 712 as well as a voltage appearing at the junction C of the resistors 713 and 714 and provides an output signal only when the ratio of the voltage at junction C to the voltage at junction B is abnormally low, for example about 3:4–1:4.

Figure 3:
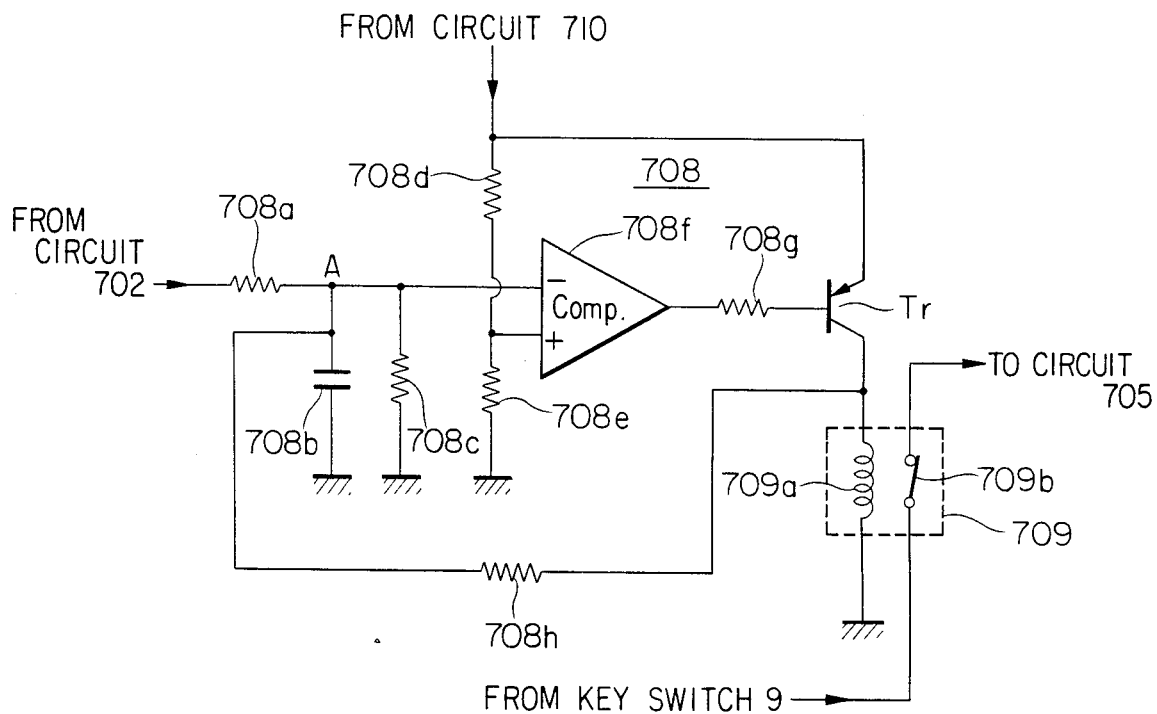
FIG. 3 shows a detailed circuit diagram of the failsafe circuit employed in the power steering control apparatus shown in FIG. 2; and, FIGS. 4A–4C show various characteristic curves used for explaining the operation of the power steering control apparatus shown in FIG. 2.

The details of the failsafe circuit 708 are shown in FIG. 3. In the figure, one terminal of a resistor 708a is connected to the output terminal of the error amplifying circuit 702 and the other terminal thereof is connected to a capacitor 708b, the combination of the resistor 708a and the capacitor 708b forming a delay (integration) circuit. Across the capacitor 708b is connected a resistor 708c which serves as a discharging resistor for the capacitor 708b after the integration has been completed. The junction of the resistor 708a, the capacitor 708b, and the resistor 708c is connected to the inverting input of a comparator 708f the non-inverting input of which is connected to the junction of voltage dividing resistors 708d and 708e. The other ends of the capacitor 708b, the resistor 708c, and the resistor 708e are grounded. The non-inverting input of the comparator 708f is set to a reference voltage determined by the dividing resistors 708d and 708e. The output of the comparator 708f is connected through a resistor 708g to the base of a transistor Tr the collector of which is connected through the relay coil 709a of the protection relay 709 to ground. The junction of the collector of the transistor Tr and the coil 709a is connected through a resistor 708h to the junction of the resistor 708a and the capacitor 708b to form a holding circuit.

In operation, the F/V converter 701 converts the frequency of pulses from the sensor 8 into a reverse-proportional voltage. The error amplifying circuit 702 compares the output voltage, as a reference, of the F/V converter 701 which corresponds to a car speed and the output voltage of the detection circuit 707 which corresponds to the current flowing through the proportional solenoid 6, and amplifies the error. The oscillation circuit 703 generates a triangle wave signal or a saw tooth wave signal at a reference frequency (500–1000 Hz) which is used to develop a pulse width modulated-wave voltage from the PWM circuit 704. This PWM circuit 704 compares the output voltages of the error amplifying circuit 702 and the triangle wave generator 703, and modulates the output waveform of the triangle wave generator 703 by the varying output voltage of the error amplifying circuit 702. The solenoid driving circuit 705 responds to the PWM voltage out of the circuit 704 to control a driving current via line 11 for the proportional solenoid 6. The shunt resistor 706 is connected between the output 12 of the proportional solenoid 6 and ground to detect a driving current. The solenoid current detection circuit 707 detects the voltage drop across the resistor 706 and feeds a voltage corresponding to the driving current of the solenoid 4 back to the error amplifying circuit 702. The failsafe circuit 708 integrates the output voltage of the error amplifying circuit 702 by the resistor 708a and the capacitor 708b shown in FIG. 3, the integrated voltage being discharged by the resistor 708c after the completion of the integration, and activates the coil 709a of the protection relay 709 in the event that the output voltage of the error amplifying circuit 702 does not reach zero during a period longer than a predetermined time interval (for example, 0.1–0.5 seconds) which is determined by the relationship between the time constant of the combination of the resistor 708a and the capacitor 708b and the reference voltage of the non-inverting input of the comparator 708f. In other words, unless the error between the output voltage corresponding to the car speed and the output voltage of the solenoid current detection circuit 707 disappears, the comparator 708f provides as an output therefrom a low level voltage to switch on the transistor Tr to continuously energize the coil 709a of the protection relay 709 to break the normally closed contact 709b whereby the electrical power of the battery 10 as a power source is interrupted to the proportional solenoid driving circuit 705 through the key switch 9 and the normally closed contact 709b. Otherwise, the proportion solenoid driving circuit 705 is energized through the closed contact 709b. The regulated voltage circuit 710 supplies from the battery 10 through the key switch 9 a predetermined constant voltage (about 5–8 V) necessary for all of the circuits but the proportional solenoid driving circuit 705 in the electric control circuit 7.

It is to be noted that the line 11 forms the positive line of the electrical wiring of a car while the line 12 forms the negative line thereof.

The operation of the circuit arrangements shown in FIGS. 2 and 3 will now be described with reference to FIG. 4.

Figure 4A:
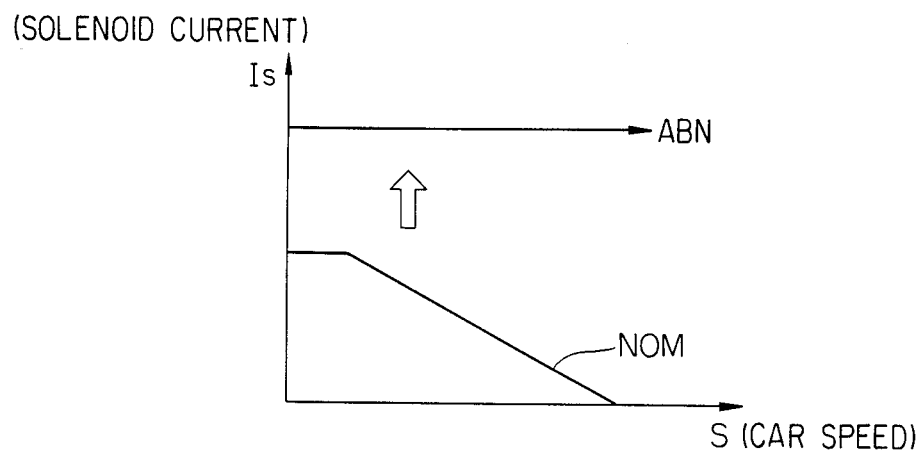
Figure 4B:
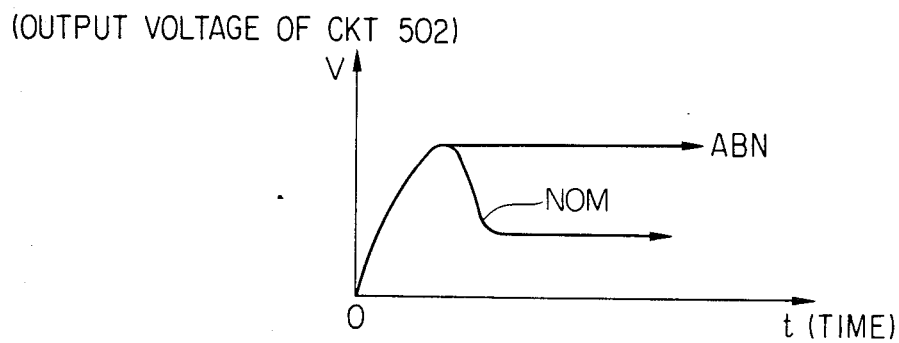
Figure 4C:
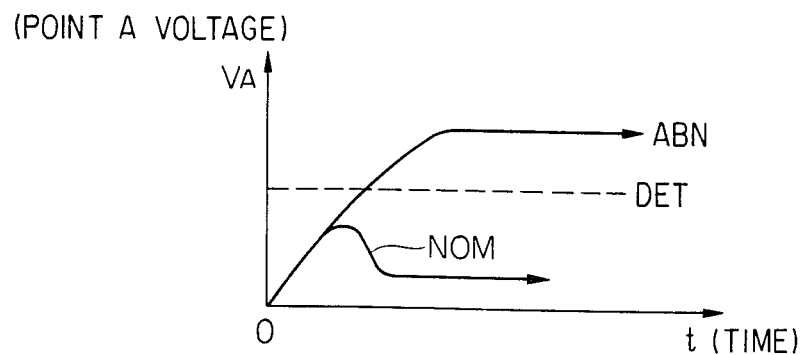

FIG. 4A shows a current characteristic (Is) of the proportional solenoid 6 as a function of a car speed (s), FIG. 4B shows an output voltage characteristic (V) of the error amplifying circuit 702 as a function of time (t), and FIG. 4C shows a voltage characteristic ($V_A$) at point A in the failsafe circuit 508 shown in FIG. 3 as a function of time (t). In FIG. 4, curves NOM and ABN denote a normal condition and an abnormal condition, respectively, and DET denotes an abnormal condition detective level determined by the reference input of the comparator 708f of the circuit 708.

In the normal condition of the error amplifying circuit 702, the PWM circuit 704, the proportional solenoid driving circuit 705, the line 11, the proportional solenoid 6, the line 12, the shunt resistor 706, and the solenoid current detection circuit 707 which form a closed loop, current corresponding to a command (reference) voltage, corresponding to a car speed, provided by the F/V converter 701 is supplied to the solenoid 6 being controlled by this feedback loop at a constant value as generally illustrated by the left portion of the curve NOM in FIG. 4A. As the car speed increases, the solenoid current Is decreases as illustrated by the right portion of the curve NOM in FIG. 4A whereby the handling of the steering of the car becomes heavy at this time for the purposes of safety.

Then, when the car speed decreases and so the command voltage of the F/V converter 701 becomes high in reverse proportion to the car speed, the error between the outputs of the circuits 701 and 707 appears. Since the error is amplified and integrated by the error amplifying circuit 702 with a very large gain, the output voltage V of the error amplifying circuit 702 gradually increases as shown by the left half of the normal characteristic curve NOM in FIG. 4B. Meanwhile, the conduction current of the proportional solenoid 6 also increases so that the feedback voltage out of the solenoid current detection circuit 707 follows i.e. increases correspondingly, whereby the output voltage V of the error amplifying circuit 702 oppositely begins to decrease as shown by the right half of the normal characteristic curve NOM in FIG. 4B and is then brought to an equilibrium state determined by the output of the converter 501 at a car speed according to which the equilibrium value is variable. Therefore, this equilibrium value is the highest when the car speed is zero, i.e. the car is stopped while being the lowest when the car speed is highest.

Accordingly, the voltage $V_A$ at point A of the failsafe circuit 708 assumes the normal characteristic curve NOM shown in FIG. 4C similar to the curve NOM in FIG. 4B. Namely, the input voltage $V_A$ of the comparator 708f first increases, then decreases and thereafter is brought to an equilibrium state before it attains the abnormal condition detective level DET of the reference input level of the comparator 708f indicated by dotted lines and hence the failsafe circuit 708 provides no output voltage therefrom so that the output of the comparator 708f is at a high voltage level to switch off the transistor Tr and therefore the contact 709a of the protection relay 709 is kept closed, thereby applying a normal voltage to the proportional solenoid driving circuit 705 and maintaining the normal operation.

In the abnormal event of the PWM 704, the proportional solenoid driving circuit 705, the shunt resistor 706, and the solenoid current detection circuit 709 in the above-noted closed loop, or of the shortcircuit between the coil wires or the coil layers of the solenoid 6, or of the ground fault of the solenoid 6, the feedback voltage to the error amplifying circuit 702 from the detection circuit 707 which corresponds to the current actually flowing through the solenoid 6 disappears so that the error of the output voltage of the detection circuit 707 with respect to the command voltage corresponding to the car speed from the F/V converter 701 becomes large, whereby the output voltage V of the error amplifying circuit 702 assumes the abnormal characteristic ABN shown in FIG. 4B. Since the error amplifying circuit 702 indefinitely provides as an output therefrom a high voltage, the feedback voltage nevertheless does not increase correspondingly, the error voltage of the circuit 702 does not decrease but will continue to provide as an output therefrom a high voltage as shown by the curve ABN in FIG. 4B.

Therefore, the voltage characteristic ($V_A$) at point A of the failsafe circuit 708 similarly assumes the abnormal curve ABN shown in FIG. 4C wherein as the above noted predetermined time interval (0.1–0.5 seconds) lapses, the level of the inverting input of the comparator 708f exceeds the level of the non-inverting input (reference input) which is set to the abnormal condition detective level DET. Namely, the predetermined time interval (0.1–0.5 seconds) corresponds to the time interval from t=0 to the cross point of the curves ABN and DET. Therefore, the output of the comparator 708f becomes low so that the transistor Tr is switched on to energize the coil 709a of the protection relay 709. At this moment when the collector of the transistor Tr becomes high, the inverting input (or point A) of the comparator 708f is fixed to the same high level, thereby holding the switch-on state of the transistor Tr and therefore the energization of the coil 709a. This holding state is kept until the key switch 9 is turned off.

The energization of the coil 709a breaks the contact 709b so that the electrical power source of the proportional solenoid driving circuit 705 and in turn the proportional solenoid 6 is interrupted, resulting in a heavy steering condition corresponding to a high speed running condition for the purposes of safety.

Thus the driver's uneasy feeling and the dangerous condition due to an unstable steering condition due to an excessive light steering condition during a high speed running are eliminated.

Also, when the feedback voltage disappears due to the ground fault of the negative wiring 12, the shortcircuit of the shunt resistor 706, and the failure of the solenoid current detection circuit 707 etc., the error amplifying circuit 702 continues to provide a certain output so that the solenoid current characteristic as a function of the car speed assumes the abnormal curve ABN shown in FIG. 4A in which a higher current is caused as compared with the normal condition. Therefore, the proportional solenoid 6 can be prevented from being over-heated and burned by the actuation of the protection relay 709 whereby the occurrence of the secondary failure is avoided.

The operation of the arrangement according to the above described U.S. patent application Ser. No. 664,416 has been described above.

Next, the operation of the power steering control apparatus shown in FIG. 2 will be described.

In the abnormal event of the ground fault of the wiring line of the car, the solenoid 6, or the shunt resistor 706 at one end, as above described, the feedback voltage to the error amplifying circuit 702 from the detection circuit 707 which corresponds to the current actually flowing through the solenoid 6 disappears so that the output voltage V of the error amplifying circuit 702 does not decrease but continues to increase as shown by the curve ABN in FIG. 4B. As a result, the voltage at point A in the failsafe circuit 708 also increases along the curve ABN shown in FIG. 4C and then exceeds the abnormal condition detective level DET in the predetermined time interval (0.5–1.5 seconds), causing the failsafe circuit 708 to be actuated to provide a high level output signal.

At the same time, since the voltage at junction C also becomes zero, the error protection circuit 715 is also activated to provide as an output therefrom a high level signal because the voltage dividing operation by means of the resistors 713 and 714 is not made due to the zero level at the output of the detection circuit 707 and therefore the voltage difference between the inputs of the error protection circuit 715 exceeds the threshold level thereof. In other words, the error protection circuit 715 which may comprise a comparator only, is activated only when the voltage at junction C provided by dividing the output of the detection circuit 707 with the resistors 713 and 714 is lower than the voltage at junction B provided by dividing the output of the F/V converter 701 with the resistors 711 and 712, by a predetermined voltage which is defined by the voltage at junction B multipled by a predetermined ratio (about ¾-¼) minus the voltage at junction C.

With the concurrent activation of the failsafe circuit 708 and the error protection circuit 715, the AND circuit 716 provides as an output therefrom a high level output to energize the coil 709a of the protection relay 709, thereby opening the normally closed contact 709b. Therefore, the power source for the proportional solenoid driving circuit 705 is interrupted so that no current flows through the solenoid 6, whereby a manual steering operation is made heavy and therefore a certain danger can be precluded as set forth above.

If the proportional solenoid 6 is heated so as to restrain the current flowing therethrough to a considerable low level due to the increased resistance (about 5–8 ohms), and/or if the output voltage of the regulated voltage circuit 710 is rendered at a low level (6–7 V) for more than the predetermined time interval such as when as the engine is re-started, a normal current commanded by the speed sensor 8 and in turn the reference voltage out of the F/V converter 701, which corresponds to the maximum current level (about 1 A) because the car speed is zero at this point, can not be flown through the solenoid 6. Therefore, the level of the feedback current signal from the detection circuit 707 is low whereby the error amplifying circuit 702 will hold its output at a high level for more than the predetermined time interval so that the failsafe circuit 708 will be activated to provide as an output therefrom the high level signal.

However, since the relationship in resistance between the series combinations of the resistors 711 and 712 as well as the resistors 713 and 714 is preset such that the voltage at junction C may not be lower than the voltage at junction B multiplied by a predetermined ratio (about ¾-¼), namely by a predetermined voltage difference, unless the output of the detection circuit 707 is zero or almost zero, the error protection circuit 715 is not activated and so no high level signal is provided as an output therefrom in the absence of the predetermined voltage difference between the inputs thereof. Therefore, the AND circuit 716 provides no high output whereby the erroneous activation of the failsafe circuit 708 can be blocked in the event of the increased temperature of the proportional solenoid 6 and/or the reduction of the power source 10. Thus, the contact 709b remains closed to still energize the solenoid driving circuit 705 whereby the steering load when the engine is re-started is made light.

According to this invention, even if the temperature of the solenoid coil is considerably increased and/or the voltage of the power source battery is considerably decreased such that the current flowing through the solenoid is reduced to correspondingly reduce the output of the solenoid current detection circuit and in turn the input of the error amplifying circuit, the error protection circuit prevents the protection relay from being erroneously activated unless such a feedback current signal is interrupted or made almost zero, advantageously resulting in a proper steering load according to the car speed at all time.

It is to be noted that although the present invention has been described along the above embodiment shown in the accompanying drawings, it should not be limited to the described embodiment and various modifications are possible without departing from the spirit of this invention.

What we claim as a patent is:

1. A power steering control apparatus comprising a car speed sensor, a power source, an electric control circuit connected to said car speed sensor and said power source, and a proportional solenoid, responsive to the output of said electric control circuit, for providing a steering reaction oil pressure;
    said electric control circuit including:
    first means for producing a command signal in inverse proportion to the output of said car speed sensor;
    second means for detecting a current signal flowing through said proportional solenoid;
    third means for comparing said command signal with said current signal as a feedback signal to develop an error signal therebetween with a high amplification gain;

fourth means for developing from said error signal a driving signal for said proportional solenoid;

fifth means, responsive to said error signal, for detecting a predetermined abnormal condition in which said amplified error signal exceeds a first predetermined value and holding said abnormal condition;

sixth means, responsive to the output of said fifth means, for passing the electrical energy from said power source to said fourth means in the normal condition while interrupting said electrical energy to said fourth means in said predetermined abnormal condition;

seventh means for comparing said command signal and said feedback signal to provide an output signal only when said output signal is larger than a second predetermined value; and eighth means for enabling the output of said fifth means when the output of said seventh means is provided.

2. A power steering control apparatus as claimed in claim 1 wherein said first means comprises a frequency-voltage converter which converts the speed signal from said car speed sensor into a corresponding voltage in inverse proportion to said speed signal.

3. A power steering control apparatus as claimed in claim 2 wherein said second means comprises a shunt resistor connected to the output of said solenoid and ground, and a solenoid current detection circuit for detecting the voltage across said shunt resistor corresponding to the solenoid current.

4. A power steering control apparatus as claimed in claim 3 wherein said third means comprises an error amplifying circuit for comparing said command signal from said frequency-voltage converter with the output voltage of said solenoid current detection circuit as a feedback signal and for developing an error signal therebetween.

5. A power steering control apparatus as claimed in claim 4 wherein said fourth means comprises a reference wave generator, a pulse width modulation circuit for modulating the reference wave from said generator with said error signal from said error amplifying circuit to develop a PWM wave voltage, and a proportional solenoid driving circuit for receiving the electrical energy from said power source through said fifth means to develop a driving current for said solenoid through an electrical wiring in the car.

6. A power steering control apparatus as claimed in claim 1 wherein said fifth means comprises an integration portion for integrating said error signal from said error amplification circuit, a comparing portion for comparing the integrated voltage of said integration portion with a reference voltage corresponding to said predetermined abnormal detective signal and for providing as an output therefrom a signal indicating the abnormal condition, and a holding portion for holding the integrated voltage of said integration portion in said abnormal condition.

7. A power steering control apparatus as claimed in claim 5 wherein said fifth means comprises an integration portion for integrating said error signal from said error amplification circuit, a comparing portion for comparing the integrated voltage of said integration portion with a reference voltage corresponding to said predetermined abnormal detective signal and for providing as an output therefrom a signal indicating the abnormal condition, and a holding portion for holding the integrated voltage of said integration portion in said abnormal condition.

8. A power steering control apparatus as claimed in claim 7 wherein said integration portion includes a first resistor and a capacitor, said comparing portion includes second and third voltage dividing resistors and a comparator for comparing the integrated voltage with the divided reference voltage and providing as an output therefrom a logic signal in the abnormal condition, and said holding portion includes a transistor the base of which is connected to the output of said comparator, the collector of which is connected through said sixth means to ground and connected to the output of said integration portion, and the emitter of which is connected to said power source.

9. A power steering control apparatus as claimed in claim 8, further including a fourth resistor for discharging the integrated voltage of said integration portion.

10. A power steering control apparatus as claimed in claim 9 wherein said sixth means comprises a protection relay having a relay coil connected between the collector of said transistor and ground and having a normally closed contact connected between said power source and said solenoid driving circuit.

11. A power steering control apparatus as claimed in claim 10, further comprising a key switch connected between said normally closed contact and said power source.

12. A power steering control apparatus as claimed in claim 1 wherein said seventh means comprises ninth means for providing said predetermined voltage difference of the output of said first means multiplied by a predetermined ratio with said feedback signal unless said feedback signal is almost zero, and a comparator connected to said ninth means.

13. A power steering control apparatus as claimed in claim 10 wherein said seventh means comprises ninth means for providing said predetermined voltage difference of the output of said first means multiplied by a predetermined ratio with said feedback signal unless said feedback signal is almost zero, and a comparator connected to said ninth means.

14. A power steering control apparatus as claimed in claim 13 wherein said ninth means comprises a first voltage divider connected between the output of said first means and ground and a second voltage divider connected between the output of said second means and ground, said first and second voltage divider being preset such that said predetermined voltage difference is provided unless said feedback signal is almost zero.

15. A power steering control apparatus as claimed in claim 14 wherein said eighth means comprises an AND gate connected to the outputs of said fifth means and seventh means.

* * * * *